Figure 1:
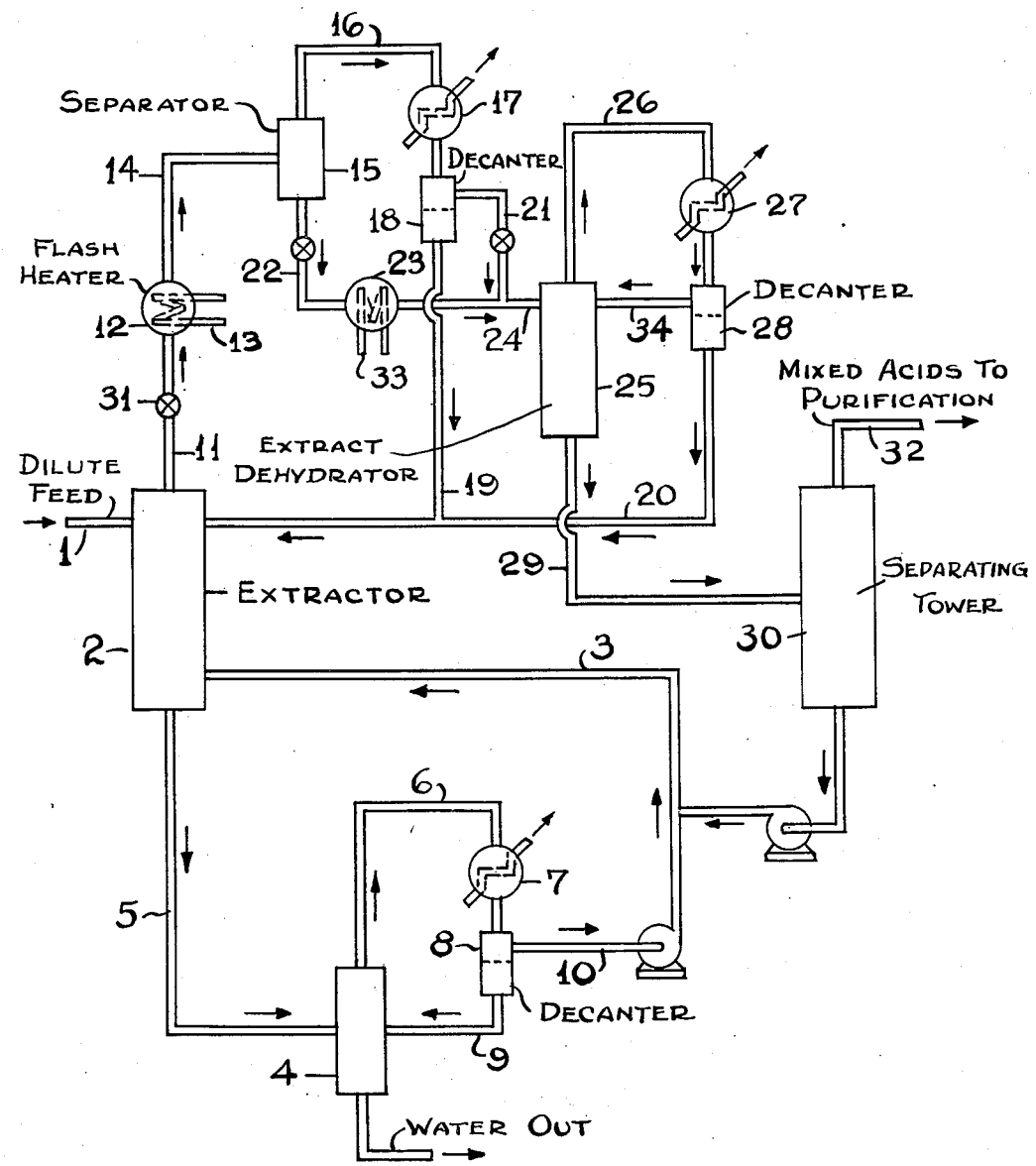

Patented Oct. 17, 1950

2,526,508

UNITED STATES PATENT OFFICE 2,526,508

RECOVERY OF FATTY ACIDS FROM DILUTE AQUEOUS SOLUTIONS

Harold W. Scheeline, East Orange, Lewis D. Etherington, Bayonne, and Jerome Perry Morgan, Maplewood, N. J., assignors to Standard Oil Development Company, a corporation of Delaware Application August 19, 1948, Serial No. 45,036

5 Claims. (Cl. 260—540)

This invention relates to an improved process for extracting and dehydrating fatty acids as present in low concentrations in aqueous solutions. More particularly, it relates to an efficient commercially feasible process for the extraction and purification of a mixture of fatty acids as found in low concentrations in the aqueous layer resulting from hydrocarbon synthesis reactions.

Hydrocarbon synthesis reactions are performed by contacting hydrogen and oxides of carbon with catalysts under various temperature and pressure conditions. The temperatures employed vary widely, as for example, in the range from about 200° C. to about 425° C. and are generally in the range from 260° C. to about 370° C. The particular temperature employed depends upon, among other factors, the type of non-gaseous hydrocarbon product desired, the character and the activity of the particular catalyst utilized, the throughput and composition of the synthetic gases and upon the reaction pressure. The pressures, likewise, vary considerably and are a function of other operative conditions such as catalyst employed, activity of the catalyst, character of the feed gases and the temperatures utilized. Operations such as described are generally conducted under conditions to secure the maximum yield of hydrocarbon constituents containing 4 or more carbon atoms in the molecule. However, under the conditions of the operation, various side reactions occur which result in the production of valuable oxygenated compounds.

The proportion of the type products obtained also varies with the conditions. In all cases, however, gaseous products removed overhead from the reaction zone are condensed and segregated into an oil phase and an aqueous phase.

The oxygenated compounds produced during hydrocarbon synthesis are distributed between the oil and water phases in an amount which is a function of the relative volume of product oil and water and the molecular weight and type of the oxygenated compounds produced. The latter factor is involved in the distribution of the oxygenated compounds in the two phases. In normal operations, the ratio of water produced to oil produced may vary over the range from about 0.8 to 3.0 volumes of water per volume of oil, depending upon the operating conditions and the catalyst employed during the synthesis. Accordingly, there is a wide variation in the proportion of the total oxygenated compounds existing in the water phase; and this extends over the approximate range from 10 to 40 weight percent.

The oxygenated compounds found in the water layer comprise the neutral compounds including alcohols, aldehydes, ketones, esters, and fatty acids.

The neutral oxygenated compounds are recovered from the water layer by distillation carried on below 100° C. The neutral compounds and their water azeotropes are thus stripped off first, leaving substantially only the fatty acids in the water. The stripped aqueous layer or acid water bottoms from most synthesis runs contains the $C_2$–$C_6$ aliphatic acids in a total concentration equivalent to about 2 to 5 weight percent as acetic acid, often nearer the lower figure. It is desirable to recover these acids in marketable purities and substantially quantitatively from the water, since their disposal as waste is not practical due to the pollution problems and any chemical disposal involves added expense in the hydrocarbon synthesis process. In addition, these organic acids respresent valuable chemical raw materials for industry.

Economic recovery of acids in such low concentrations is quite difficult to achieve by conventional distillation methods because of the prohibitive heat requirements and equipment sizes necessitated by the very dilute feeds. This applies of course to any very dilute aqueous solution of lower fatty acids as well as the dilute solutions obtained from hydrocarbon synthesis reactions discussed.

Recent studies have shown that a solvent extraction process, utilizing high-boiling selective solvents such as isophorone, may be applied advantageously to the recovery of the lower fatty acids from very dilute aqueous solutions. In such a process, these acids are extracted from water solutions by the solvent in a countercurrent operation, utilizing conventional extractors such as packed towers and perforated plate columns. Countercurrent treatment of the dilute aqueous feed with solvent, usually performed at atmospheric temperature, results in an extract containing the bulk of the fatty acids originally present in the aqueous feed, together with some of the water as dictated by equilibrium solubility relationships. Since the desired final product is substantially anhydrous acids, it is necessary to carry out two distillation operations on this extract, the first having the purpose of separating water from the extract and the second, separating the anhydrous mixture of acids from the bulk of the solvent.

In any case, following the conventional extraction step, the essentially acid-free water layer or raffinate from the extractor contains an equilibrium quantity of dissolved solvent which is concentrated by conventional fractionation and recycled to the extractor for reuse. The extract, itself, from the extractor, containing most of the original acids and an equilibrium quantity of dissolved water, is fractionated to produce anhydrous acid product and water-free solvent, the latter being recycled to the extractor for reuse. Recycle solvent from the acid-solvent fractionation step (at its boiling point) is at a temperature which is appreciably higher than the acid-water feed to the extractor, even when the extract fractionation is effected at subatmospheric pressures. For example, the boiling point is isophorone is about 160° C. at 0.2 atmosphere pressure. In such cases, it is customary to cool the hot recycle solvent by heat exchange with appropriate streams, such as extract, raffinate, or cooling water, before returning the solvent to the extractor which is usually operated at essentially constant atmospheric temperature.

There are a number of advantages to be gained in utilizing sub-atmospheric pressures in the dehydration acid-solvent separating distillations, among them being the avoidance in this manner of subjecting the solvent to high temperatures that would lead to chemical instability, and avoidance of the use of an expensive high temperature heating medium for supplying heat to the bottoms of the dehydrator and acid-solvent separating towers. If, however, the extract from the countercurrent extraction operation is introduced directly into a vacuum system for dehydration, very large equipment sizes result because of the large volume of vapor evolved in a vacuum distillation operation and the low condensation temperature of such vapor which increases the surface required in the condensing units.

One of the objects of this invention is to provide a commercially feasible process for extracting lower fatty acids from dilute aqueous solutions utilizing a high boiling polar organic solvent as the extractant.

Another object is to provide a process wherein the loss of the before-mentioned extractants because of thermal degradation is substantially reduced.

Other objects will be apparent from the following discussion to those skilled in the art.

Further specific objects are to provide for control of extraction zone conditions, such as utilizing a temperature gradient to secure certain advantages of high temperature operation with little diminution in selectivity of the solvent for the fatty acids, and to provide for a flash evaporation of most of the water that is extracted by the solvent.

This invention deals with a solvent extraction process for the concentration of a lower fatty acid, or a mixture of lower fatty acids present in a dilute aqueous solution employing a high boiling polar organic solvent as the extractant.

It is to be understood that whenever the term, "high boiling polar organic solvent," is used hereafter that it connotes normally liquid organic compounds having, at most, limited solubility in water, good extractive capacities for acetic and propionic acids, and having boiling points substantially above the boiling points of the $C_4$ fatty acids, e. g., 160° C., or higher. Among such polar solvents are: Methyl cyclohexanone, B. P. 165° C.; furfural, B. P. 162° C., isophorone, B. P. 215° C., the cresols, and $C_5-C_{12}$ carboxylic acids.

The general term, mixture of lower fatty acids, is hereafter used to indicate a mixture of predominantly up to and including the $C_4$ aliphatic acids.

It is to be understood, of course, that, while the process of this invention is applicable to the dehydration of a mixture of fatty acids, it is also applicable where there is only one acid present in the aqueous solution. In the descriptions that follow of the concentration of the acids the term "mixture of fatty acids" can therefore usually be replaced by one of the specific acids, i. e., acetic acid.

This invention will be further explained by reference to the accompanying flow diagram, Fig. 1.

In the system shown, the preheated aqueous acid feed as available, containing the mixture of fatty acids in about 2% concentration by weight, is pumped through line 1 to the upper part of the extractor 2. This extractor operates with a temperature differential between top and bottom of about 22° C. The temperature and pressure at the top and bottom of extractor 2 are respectively about 110° C., 30 p. s. i. g. and 133° C., 35 p. s. i. g. The water, acids and solvent at these conditions are in the liquid phase due to the pressure maintained. Isophorone in the ratio of about 1.40 lbs. per lb. of dilute acid feed enters extractor 2 near the bottom through line 3 and passes upward through the extractor countercurrent to the water and extracts about 99 percent of the acids fed to the tower.

The extracted or spent water layer containing about 1 percent isophorone passes to a solvent recovery still 4 through line 5. The isophorone-water tower overhead vapor is taken through line 6 and condenser 7 to decanter 8 where it separates into two layers. The water layer is returned through line 9 as additional feed to the solvent recovery still and the isophorone layer is sent to the recycled isophorone stream 3 by line 10.

The liquid extract phase leaving the extractor 2 through line 11 contains the mixture of fatty acids dissolved in isophorone together with an appreciable quantity of water. The solubility of water in isophorone under the conditions existing at the top of the extractor is about 10 weight percent on isophorone.

The acid enriched extract is taken through line 11 through pressure reducing valve 31 to flash evaporation zone 12 which is supplied by indirect heat through line 13. The release in pressure itself causes some vaporization of the water. The extract is flashed by heating at about 127° C. and at atmospheric pressure and passed through line 14 with a minimum of heat loss to separating drum 15. The flash evaporation is conducted by bringing the components up to temperature very rapidly so that volatilization occurs almost instantaneously. The temperature is chosen so that the maximum volatilization of the water occurs without excessive volatilization of the other ingredients. The vapor taken off overhead from drum 15 through line 16 consists of about 80 percent of the water carried over from the extractor, about 8 percent of the acids and about 2 percent of the isophorone. These vapors are cooled and condensed in condenser 17 and collected in decanter 18 where the liquid separates into two layers. The water layer, containing about 1.5 to 2 weight percent acid, is recycled to near the top of the extractor through lines 19 and 20 in order to minimize acid losses from the system. The recycled water layer re-enters extractor 2 through line 20 at the position corresponding to a similar acid concentration in the extractor. This is done in order to accomplish as much acid separation as possible in the extractor rather than in the subsequent dehydration steps which necessitate heat. The isophorone layer from decanter 18 passes through lines 21 and 24 to or near the top of the dehydrator tower 25.

The residual liquid of predominantly isophorone and extracted acid remaining in separating drum 15 is withdrawn through line 22 and further flashed in a second flash evaporation zone 23 heated by indirect heater 33 at about 127° C. and reduced pressure, i. e., 120 mm. mercury absolute.

Vapor and liquid, the latter mostly isophorone and acid, the former mostly water, from the second flash evaporation zone are passed without separation into dehydrator 25 through line 24 at a point just above the top plate. The flashed vapors from flash zone 23 enter the dehydrator at or near the top in order to avoid the necessity of an excessively long tower. The solvent layer in line 21 from decanter 18 enters the dehydrator 25 at a similar position, i. e., at or near the top, because its acid content is relatively low and it can, therefore, be more effectively used as a reflux wash. Thus, conveniently the streams from line 22 and line 21 can join as shown in line 24. The top of this tower 25, in addition to its usual functions as a dehydrator tower, acts as a separator for separating the flashed vapors from flash zone 23 entering through line 24 from the liquid portion of the feed from flash zone 23 and decanter 18. The vapor taken overhead from dehydration tower 25 comprises therefore the flashed vapors from flash zone 23 plus the vapors evolved from the dehydration distillation in the tower 25 itself. The overhead vapors consist therefore of largely water plus small amounts of acid and isophorone. The isophorone-water-acid vapors are taken overhead from dehydration tower 25 through line 26 and condenser 27 to decanter 28. The isophorone layer from decanter 28 is returned as reflux through line 34 to dehydrator 25 and the water layer is returned through line 20 to extractor 2 to have its residual entrained acid recovered. The dehydrator tower 25 is operated at reduced pressure, conveniently the same pressure as in flash zone 23.

The dehydrator bottoms consisting essentially of dilute fatty acids in isophorone are sent to an acid-solvent separating distillation tower 30 through line 29. This tower also operates under reduced pressure in order to keep the temperature to which the solvent is exposed at as low a level as possible and thereby minimize its degradation. The overhead product from tower 30 taken off through line 32 contains the acids which are purified elsewhere. The isophorone is recovered as bottoms and recycled without heat exchange through line 3 to the extractor 2.

It should be noted that the first flash evaporating zone 12 is operated at approximately atmospheric pressure. Heat is supplied to the extract in an amount sufficient to vaporize from 50 to 80 percent of the water present (plus equilibrium quantities of solvent and acid). Vapors evolved in the atmospheric flash stage have a relatively high condensation temperature (about 100° C.) and a minimum of surface is therefore required for their condensation.

The liquid residue from the atmospheric flash is then subjected, as indicated, to further flash heating in another flash zone under reduced pressure, say 100 to 150 mm. In this reduced pressure flashing operation from 50 to 95 percent of the residual water is vaporized along with approximately equal quantities of solvent and acid and the temperature of the liquid residue brought up as far as possible to minimize the quantity of reboiler vapor required in the dehydrator tower. The temperature here is brought up to a point to get maximum water off, and minimize sensible heat load on 25 as mentioned below. However, the maximum practical temperature is fixed at the point where too much isophorone starts boiling over. For example, enough isophorone from 28 can carry more liquid water back to 25 than being vaporized in 23. The amount of heat supplied in the first vacuum flash stage is so adjusted that maximum water is driven off and a maximum temperature elevation of the residual liquid accomplished without vaporizing an excessive quantity of acid and solvent. The mixture of vapors from the reduced pressure stage is fed into the reduced pressure dehydration tower where the final residual water is removed from the extract by distillation with vapor provided by reboiling a fraction of the dehydrated solvent acid mixture.

The hot recycle bottoms from the acid-solvent separating still is fed directly to the lower portion of the extractor without a heat exchange step and is, therefore, at a higher temperature than the aqueous acid feed entering the extractor near the top. As previously stated, this results in a temperature gradient with the hotter portion of the extractor at the bottom. The extractor thus serves itself as a heat exchanger, and expensive alloy exchanger surface is saved.

The recycling of the hotter solvent stream to the bottom of the extractor results in a large quantity of sensible heat being transferred to the raffinate or acid free bottoms from the extractor. This heat is efficiently utilized in the succeeding fractionation step for recovering dissolved solvent from this raffinate. Reboiler surface as well as heat is thus saved in the solvent recovery step. At the extractor bottom, because of this elevated raffinate temperature, the equilibrium solubility of isophorone in water is reduced and, therefore, solvent recovery requirements are also reduced.

In addition, at the resulting elevated average extractor temperature, liquid viscosity and interfacial tension are reduced and the rate of transfer of acids between water and isophorone phases is increased. All of these factors tend to decrease the required extractor dimensions for a given scale of operations.

The data given in the following table were obtained on the extraction of acetic and butyric acids from water with the two solvents indicated and at various temperatures. In the data shown the acid distribution constant or acid capacity factor ($K_1$) of the solvent for acetic acid is the ratio of the acid concentrations (weight percent) in the solvent phase and in the water phase at equilibrium. The capacity factor primarily determines the ratio of solvent to feed in the extractor and also the size and number of plates in the extractor. It is desirable for the extracting solvent to have a high capacity factor to minimize the solvent circulation and hence the size of the recovery plant. For the extraction of acetic acid from water, a solvent possessing a capacity factor equal to or greater than 1 is desirable.

The distribution constant ($K_2$) for water is the ratio of the water concentration (weight percent) in the solvent phase to that in the aqueous phase at equilibrium. The selectivity or Beta of the solvent measures the sharpness of separation between water and acetic acid which can be accomplished in the extraction process. The selectivity is the ratio of the acid distribution constant to the water distribution constant.

$$\text{Beta} = \frac{K_1}{K_2}$$

TABLE

*Equilibrium distribution of fatty acid between water and solvent*

| Solvent | Temp., 0° C. | Organic Layer | | Aqueous Layer | | $K_1$ | $K_2$ | Beta |
|---|---|---|---|---|---|---|---|---|
| | | Acid, Wt. Per Cent | H₂O, St. Per Cent | Acid, Wt. Per Cent | Solvent, Wt. Per Cent | | | |
| Isophorone B. P. 215° C | 25 | $CH_3COOH$ 1.09 | 4.25 | $CH_3COOH$ .86 | 1.10 | 1.27 | .043 | 30 |
| | 75 | 1.06 | 6.15 | .96 | .97 | 1.10 | .063 | 18 |
| | 125 | 1.15 | 7.55 | 1.13 | | 1.02 | .083 | 12 |
| | 25 | $C_3H_7COOH$ 2.26 | 3.79 | $C_3H_7COOH$ .18 | | 1.24 | 12.6 | .039 | 323 |
| | 75 | 2.26 | 3.54 | .23 | | .83 | 9.8 | .035 | 280 |
| | 125 | 1.07 | 6.52 | .14 | | .86 | 7.65 | .066 | 116 |
| o-Cresol B. P. 191.5° C | 25 | $CH_3COOH$ .92 | 12.07 | $CH_3COOH$ 1.09 | | 1.04 | .84 | .123 | 6.8 |
| | 75 | .92 | 15.27 | 1.08 | | 3.13 | .85 | .16 | 5.3 |
| | 25 | $C_3H_7COOH$ 1.82 | 9.26 | $C_3H_7COOH$ .30 | | 1.48 | 6.08 | .93 | 65 |
| | 75 | 1.81 | 9.73 | .29 | | 3.13 | 6.25 | .101 | 63 |

Figure 2:
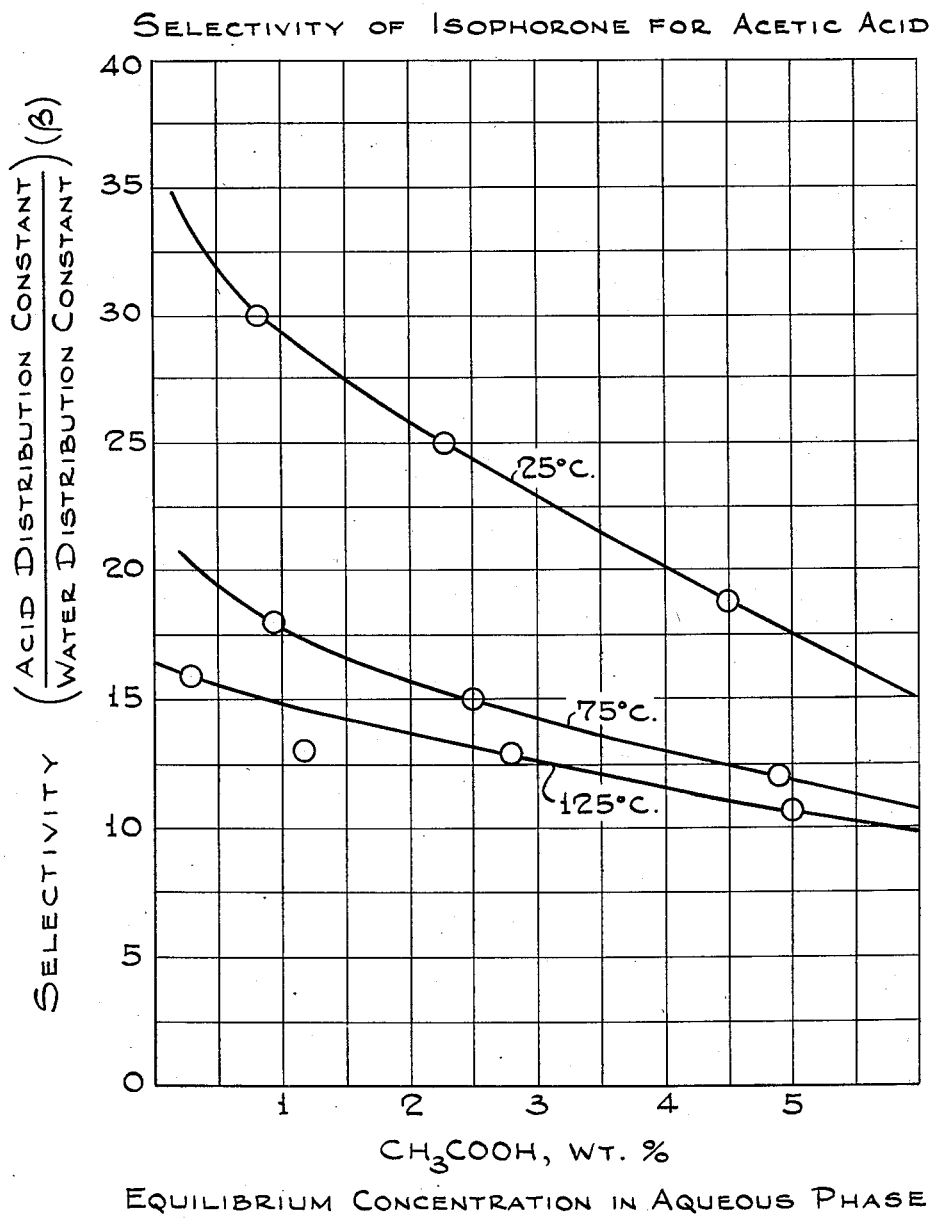

$K_1 = \frac{CH_3COOH \text{ Wt. Per Cent in Organic Layer}}{CH_3COOH \text{ Wt. Per Cent in Aqueous Layer}}$ $K_2 = \frac{H_2O \text{ Wt. Per Cent in Organic Layer}}{H_2O \text{ Wt. Per Cent in Aqueous Layer}}$ $\text{Beta} = K_1/K_2$ The preceding table and the graph, Fig. 2, well demonstrate the excellent acid extraction properties of high-boiling polar solvents such as isophorone. As shown by these data, the selectivity or B-factor of isophorone for fatty acids decreases with temperature. However, the selectivities are at such a high level over the range of temperatures considered that change in selectivities with temperature does not affect appreciably the economics of the extraction process as described.

In general, the preferred temperature limits for the operations in the extractor are fixed by the temperature at which the acid feed solution is available and by the temperature of the solvent from the acid-solvent still. For isophorone the latter temperature is about 160° C. at, for example, 0.2 atmosphere absolute pressure. If the temperature at which the acid feed solution is available is appreciably above 100° C., it may be desirable to precool the feed in order to reduce the equilibrium amount of dissolved water in the extract to the flash zones and dehydrator. Also, if the temperature of the recycled solvent to the extractor is excessively high, it may be desirable to partially precool the solvent to the extractor in order to reduce the temperature, and therefore the water content, of the extract. The upper temperature limit of the gradient in the extractor is, in any case, the boiling point of the extractant. The pressure in the extractor is sufficient to keep the water there in the liquid phase.

At no point in the operation is the temperature of the solvent permitted to rise above that at which appreciable chemical instability occurs, i. e., above 150–190° C. in the case of isophorone. Temperature is controlled by the application of the proper pressure or vacuum at each point in the process and by controlling the quantity of heat supplied in the flashing steps.

The apparatus used in the process of this invention may be standard apparatus for carrying out extractions with appropriate auxiliary stills and separator vessels and at elevated temperatures. Fresh extractant may be added as needed to the recycled and recovered extractant. If desired, only one flashing stage may be used, depending upon the economies of the operation.

If only one flashing stage is used, it is more desirable to operate this at atmospheric pressure.

As will be apparent from the foregoing, the present invention may be practiced with any of the above types of extractant solvents and with procedures other than those specifically described and under varied conditions of temperatures, pressures, or concentrations of materials but with controls indicated. Such modifications are part of this invention and are intended to be included therein.

We claim:

1. A process for separating and dehydrating a mixture of $C_2$ through $C_4$ fatty acids present in a dilute aqueous solution which comprises the steps of extracting the acids with a high boiling polar oxygenated organic solvent as the extractant, said high boiling polar oxygenated organic solvent having good extractive capacities for $C_2$ and $C_3$ fatty acids, limited solubility in water and a minimum boiling point of 160° C.; recovering the polar organic solvent extract phase containing polar organic solvent, water, and extracted acids; flash heating this extract phase at approximately atmospheric pressure to vaporize off a major proportion of the water and only a minor proportion of the polar organic solvent and acids contained therein; discharging the predominantly acid solvent mixture bottoms from the first flash heating zone; subjecting the thus discharged acid solvent mixture to a second flash heating at reduced pressure to vaporize a substantial quantity of the residual water contained therein and only minor amounts of acids and solvent; discharging the resultant mixture of flashed vapor and liquid acid-solvent mixture to a dehydration distillation zone; distilling this predominantly acid-solvent mixture at reduced pressure in the dehydration zone; taking overhead a vapor mixture comprising water and polar organic solvent including the flashed vapor from the second flash heating step; discharging a substantially anhydrous acid solvent mixture bottoms from the dehydration zone; distilling off the acids at reduced pressure from this acid solvent mixture.

2. A process as in claim 1 wherein the mixture of the flashed vapors and the liquid predominantly acid solvent mixture from the second flash heating step enters the dehydration zone at its upper portion.

3. A process as in claim 1, including the additional step of recycling the hot polar organic solvent bottoms from the final acid distillation step to the extraction step without substantial cooling of the solvent bottoms.

4. A process for dehydrating acetic acid present in a dilute aqueous solution which comprises the steps of countercurrently contacting the dilute acetic acid solution entering the extraction means with isophorone which enters the extraction means at a temperature below its atmospheric boiling point but above the temperature of the dilute acetic acid solution; recovering a resultant extract phase of isophorone acetic acid and water; flash heating this extract phase at approximately atmospheric pressure to vaporize off a major proportion of the water contained therein and only a minor proportion of the acetic acid and isophorone; discharging the residual acid solvent mixture from the flash heating step and subjecting it to a second flash heating at reduced pressure to vaporize a substantial quantity of the residual water contained therein and only minor proportions of isophorone and acetic acid; discharging the resultant mixture of flashed vapors and liquid acetic acid isophorone extract from the second flash heating step to the upper portion of a dehydration distillation zone: cooling and condensing the overhead vapors from the first flash heating step; decanting the resulting condensate into an isophorone layer and a water layer; returning the water layer to the cooler zone of the extraction means; discharging the isophorone layer to the upper portion of the dehydration distillation zone; distilling the acid-solvent mixture in the dehydration distillation zone at reduced pressure; taking overhead from the distillation zone a vapor mixture comprising water and isophorone including flashed vapors from the second flash heating step; cooling and condensing the overhead vapors; decanting the condensate into a water layer and an isophorone layer; recycling the water layer to the cooler zone of the extraction means; recycling the isophorone layer to the upper portion of the dehydration distillation zone; discharging a substantially anhydrous acid isophorone mixture bottoms from the dehydration distillation zone; distilling off acetic acid at reduced pressure from this anhydrous acid solvent mixture and recycling the hot isophorone bottoms from the acid distillation step without substantial cooling to the hotter zone of the extraction means.

5. A process for concentrating an aqueous solution of a $C_2$ to $C_4$ lower fatty acid which comprises the steps of extracting the acid with a high boiling polar oxygenated organic solvent with a temperature gradient such that an upper temperature not exceeding the boiling point of the polar organic solvent is maintained at a point of entry of the extractant, and a lower temperature is maintained at a point of entry of the aqueous fatty acid solution and at a pressure which maintains the water in the liquid phase, said high boiling polar oxygenated organic solvent having good extractive capacities for $C_2$ and $C_3$ fatty acids, limited solubility in water and a minimum boiling point of 160° C.; recovering the polar organic solvent extract phase containing water, polar organic solvent and extracted acid at a lower pressure from that maintained in the extraction step; and flash heating the extract phase in at least two stages of flash heating wherein the first stage of flash heating is conducted at approximately atmospheric pressure and remaining stages of flash heating are conducted at progressively diminishing pressures to vaporize off a major proportion of the water and only a minor proportion of the acid and polar organic solvent contained therein.

HAROLD W. SCHEELINE.
LEWIS D. ETHERINGTON.
JEROME PERRY MORGAN.

REFERENCES CITED

The following references are of record in the file of this patent:

UNITED STATES PATENTS

| Number | Name | Date |
|---|---|---|
| 1,624,810 | Suida | Apr. 12, 1927 |
| 1,624,811 | Suida | Apr. 12, 1927 |
| 1,839,894 | Ricard et al. | Jan. 5, 1932 |
| 1,839,932 | Ricard et al. | Jan. 5, 1932 |
| 2,143,345 | Frankel et al. | Jan. 10, 1939 |
| 2,165,438 | Allquist | July 11, 1939 |
| 2,275,862 | Othmer | Mar. 10, 1942 |
| 2,333,756 | Wentworth | Nov. 9, 1943 |
| 2,369,655 | Boehm | Feb. 20, 1945 |
| 2,425,661 | Weber et al. | Aug. 12, 1947 |

OTHER REFERENCES

McClure: "Chem. Eng. News," vol. 22, pp. 416–421 (1944).